(12) United States Patent
Farouz-Fouquet

(10) Patent No.: US 11,579,050 B2
(45) Date of Patent: Feb. 14, 2023

(54) SYSTEM FOR SAMPLING AND ANALYZING CONTRAILS GENERATED BY AN AIRCRAFT

(71) Applicant: AIRBUS SAS, Blagnac (FR)

(72) Inventor: Mathias Farouz-Fouquet, Blagnac (FR)

(73) Assignee: AIRBUS SAS

( * ) Notice: Subject to any disclaimer, the term of this patent is extended or adjusted under 35 U.S.C. 154(b) by 52 days.

(21) Appl. No.: 17/190,623

(22) Filed: Mar. 3, 2021

(65) Prior Publication Data

US 2021/0285851 A1 Sep. 16, 2021

(30) Foreign Application Priority Data

Mar. 11, 2020 (FR) ...................................... 2002415

(51) Int. Cl.
  *G01N 1/22* (2006.01)
  *B64D 47/00* (2006.01)
  *G01N 15/02* (2006.01)

(52) U.S. Cl.
  CPC ........... *G01N 1/2252* (2013.01); *B64D 47/00* (2013.01); *G01N 15/02* (2013.01)

(58) Field of Classification Search
  CPC .. G01N 1/2252; G01N 1/2273; G01N 1/2247; B64D 47/00; B64D 43/00; B64D 2045/0085
  See application file for complete search history.

(56) References Cited

U.S. PATENT DOCUMENTS 3,707,869 A * 1/1973 Raynor ................ G01N 1/2247
  73/864.31
2013/0110326 A1 5/2013 Kelm

FOREIGN PATENT DOCUMENTS

EP 2860374 A1 4/2015
KR 20100089486 A * 8/2010 ............... G01N 1/42

OTHER PUBLICATIONS

Jones et al., "A Methodology for in-situ and remote sensing of microphysical and radiative properties of contrails as they evolve into cirrus", Mar. 20, 2012, Atmospheric Chemistry and Physics Discussions, pp. 7829-7877 (Year: 2012).*
A Petzold: "Near-field measurements on contrail properties from fuels with different sulfur content", Dec. 31, 1997 (Dec. 31, 1997), pp. 29867-59880, XP055745513, Internet: URL:https:jjelib.dlr.de/32388/1/petz.pdf, [extrait le Oct. 30, 2020].

(Continued)

*Primary Examiner* — David Z Huang

(74) *Attorney, Agent, or Firm* — Lerner, David, Littenberg, Krumholz & Mentlik, LLP

(57) ABSTRACT

The system, configured for being on board an aircraft, includes a probe for collecting samples of contrail, a chamber for collecting the samples, a collecting conduit for conducting the samples from the collecting probe the collecting chamber and at least one device for measuring at least one parameter characterizing the samples in the collecting conduit while they are conducted from the collecting probe to the collecting chamber. By virtue of the system, it is not necessary to use a second aircraft that follows the aircraft for collecting samples of contrail.

12 Claims, 3 Drawing Sheets

(56) References Cited

OTHER PUBLICATIONS

C. Voigt et al: "In-situ observations of young contrails—overview and selected results from the CONCERT campaign", Atmospheric Chemistry and Physics, vol. 10, No. 18, Jan. 1, 2010 (Jan. 1, 2010), pp. 9039-9056, XP055745383, DOI: 10.5194/acp-10-9039-2010.
French Search Report for Application No. FR2002415 dated Nov. 16, 2020, 2 pages.

* cited by examiner

SYSTEM FOR SAMPLING AND ANALYZING CONTRAILS GENERATED BY AN AIRCRAFT

FIELD OF THE INVENTION

The present invention relates to the analysis of condensation trails (or "contrails") generated by an aircraft. In particular, it relates to the analysis and the sampling of condensation trail generated by an aircraft.

BACKGROUND OF THE INVENTION

Measuring emissions generated by the jet engines of an aircraft in flight is important for understanding the contribution of these emissions to global climate change. It will be necessary in order to study new generation fuels, such as biofuels or hydrogen. In particular, understanding the contribution of condensation trails to global climate change is also important.

To analyze condensation trails, it would be possible to envisage using a second aircraft equipped with collection probes which collect samples of air and ice crystals from the condensation trails generated by an aircraft preceding it. Now, placing an aircraft in the jet engine flow of an aircraft preceding it may prove inefficient and costly by virtue of the use of the second aircraft.

BRIEF SUMMARY OF THE INVENTION

An aspect of the present invention may mitigate these drawbacks by proposing a system and a method for sampling and analyzing condensation trails.

An aspect of the invention relates to a system for sampling and analyzing condensation trail generated by at least one jet engine of an aircraft in flight.

According to an embodiment of the invention, the system is configured to be embedded onboard the aircraft and comprises at least:

a collection probe configured to be fixed to the aircraft by a fixing device and to collect samples of the condensation trail generated by said jet engine of said aircraft in flight;

a collection chamber configured to gather the samples collected by the collection probe;

a collection tube configured to conduct the samples from the collection probe to the collection chamber;

at least one first measurement device configured to measure at least one parameter characterizing the samples in the collection tube while said samples are conducted from the collection probe to the collection chamber.

Thus, by virtue of the system configured to be embedded onboard the aircraft, there is no need to use a second aircraft following the first aircraft in order to collect samples of the condensation trails generated by the first aircraft.

In addition, the system comprises a vacuum pump configured to drive the samples from the collection probe to the collection chamber.

Furthermore, the system comprises a temperature regulation device configured to maintain the interior of the collection tube at a desired operating temperature.

Moreover, the temperature regulation device comprises an insulating tube at least partly jacketing the collection tube, the insulating tube being configured to circulate a refrigerant or a mix of refrigerant and air between the collection tube and the insulating tube.

Furthermore, the or each of the first measurement devices comprises a first measurement unit configured to determine at least one parameter characteristic of a chemical composition of the samples.

Furthermore, the or each of the first measurement devices comprises a second measurement unit configured to determine at least one parameter characteristic of a particle size analysis of particles contained in the samples.

Advantageously, the collection chamber is configured to be maintained at a temperature of conservation of the samples gathered in the collection chamber.

Moreover, the system comprises at least one second measurement device configured to measure at least one parameter characteristic of the samples gathered in the collection chamber.

In addition, the or each of the second measurement devices comprises a third measurement unit configured to determine a parameter characteristic of a chemical composition of the samples.

Furthermore, the or each of the second measurement devices comprises a fourth measurement unit configured to determine a parameter characteristic of optical properties of the samples.

According to a particular feature, the fixing device comprises:

a support configured to be fixed to the fuselage of the aircraft;

a movement module fixed to the support, the movement module being configured to move the collection probe.

According to a first embodiment, the movement module comprises a retractable rod having a first end to which the collection probe is fixed, the retractable rod being configured to alternately assume at least a first configuration in which the retractable rod is extended to bring the collection probe into a first position in which the collection probe is located in the condensation trail and a second configuration in which the retractable rod is retracted to distance the collection probe from the condensation trail in a second position.

According to a second embodiment, the movement module comprises an articulated rod, the articulated rod having a first end comprising an articulation fixed to the support and a second end to which the collection probe is fixed, the articulation being configured to move the collection probe alternately at least between a third position in which the collection probe is located in the condensation trail and a fourth position in which the collection probe is separated from the condensation trail.

The invention relates also to a method for using the system for sampling and analyzing condensation trail generated by at least one jet engine of an aircraft in flight as described above.

According to an aspect of the invention, the method comprises the following steps:

a step of collection, by the collection probe, of samples of the condensation trail generated by said jet engine of said aircraft in flight;

a step of conducting, by the collection tube, of the samples collected by the collection probe to the collection chamber;

at least one step of measurement, by the first measurement device or devices, of at least one parameter characteristic of the samples in the collection tube while they are conducted from the collection probe to the collection chamber;

a step of collection, in the collection chamber, of the samples collected by the collection probe and conducted by the collection tube.

The invention relates also to an aircraft, in particular a transport airplane, comprising a sampling and analysis system such as that specified above.

BRIEF DESCRIPTION OF THE DRAWINGS

The invention, with its features and advantages, will emerge more clearly on reading the description given with reference to the attached drawings in which.

DETAILED DESCRIPTION

Figure 1:
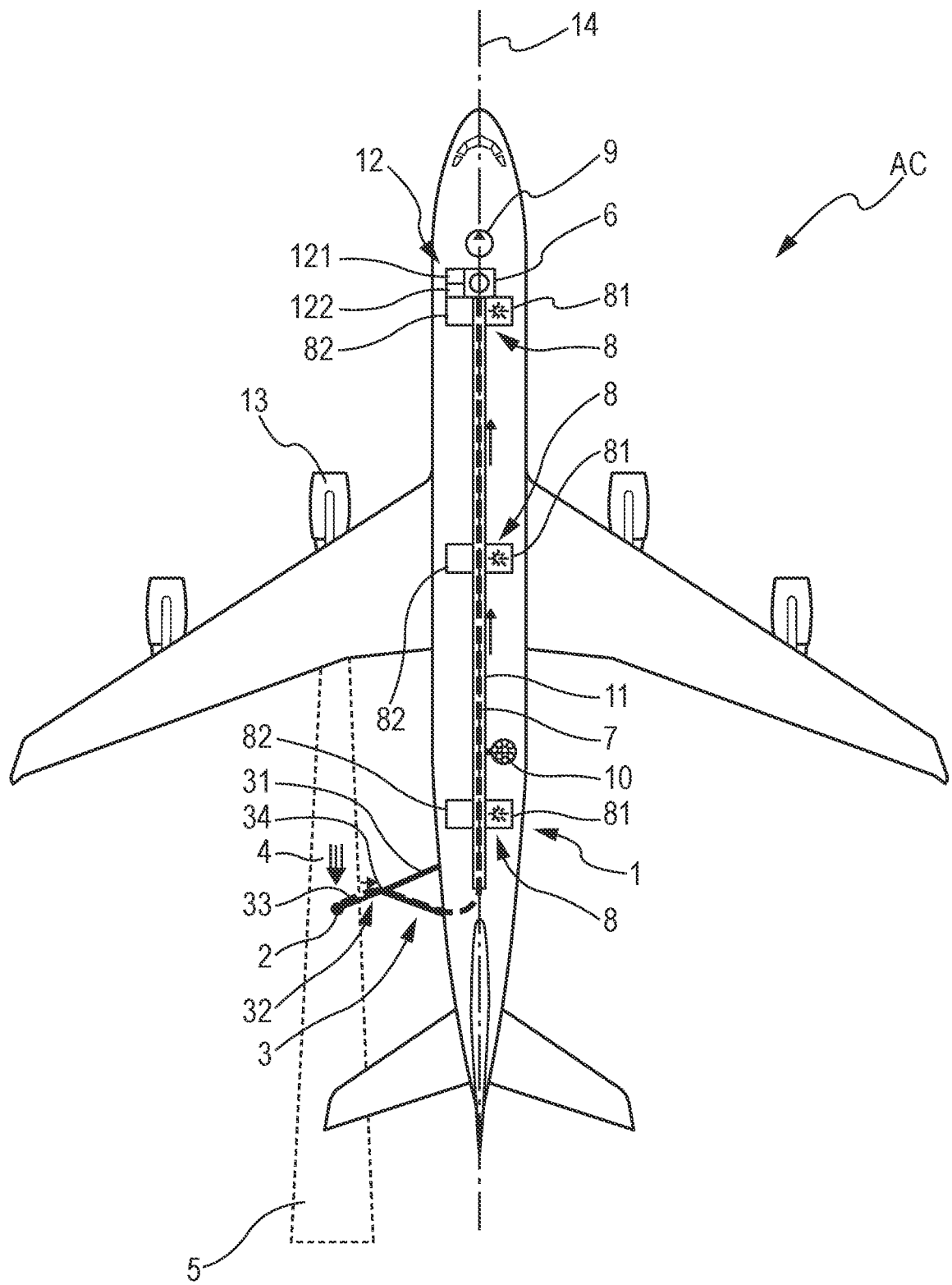
FIG. 1 represents a plan view of an aircraft in flight generating condensation trails and with an embedded sampling and analysis system.

FIG. 1 represents the system 1 for sampling and analyzing condensation trail 5 generated by at least one jet engine 13 of an aircraft AC in flight. Hereinafter in the description, the sampling and analysis system is called "system 1".

The system, configured to be embedded on the aircraft AC, comprises a collection probe 2 configured to be fixed to the aircraft AC by a fixing device 3. The collection probe is also capable of collecting samples 4 of the condensation trail 5. In FIG. 1, the samples 4 are represented schematically by an arrow indicating their direction of movement with respect to the aircraft AC.

Generally, the samples 4 of the condensation trail 5 contain elements of the condensation trail 5. Thus, the samples include at least one of the following elements: ice crystals, unburnt fuel residues (HC), oxygen ($O_2$), ozone ($O_3$), carbon monoxide (CO), carbon dioxide ($CO_2$), nitrogen oxides ($NO_x$).

Advantageously, the collection probe 2 comprises a valve that makes it possible to prevent or allow the collection of the samples 4.

The system 1 therefore makes it possible to take samples 4 directly from the condensation trail 5. Indeed, the collection probe 2 can be arranged directly in the condensation trail 5 generated by the jet engine of the aircraft on which said system 1 is incorporated.

The system 1 also comprises a collection chamber 6 configured to gather the samples 4 collected by the collection probe 2 and a collection tube 7 (represented by a dotted line in FIG. 1) configured to conduct the samples 4 from the collection probe 2 to the collection chamber 6.

The system 1 can be installed onboard the aircraft AC in the following manner. The collection probe 2 is configured to be fixed to the aircraft AC on a part of the fuselage of the aircraft AC behind the jet engine or engines 13 of the aircraft AC in the direction of movement of the aircraft AC. The collection tube 7 is configured to be installed parallel to a longitudinal axis 14 of the aircraft AC onboard the aircraft AC. The collection chamber 6 is configured to be installed in a part of the aircraft AC forward of the jet engine or engines 13.

In a nonlimiting manner, the collection tube 7 can have a length lying between a length substantially equal to half the length of the aircraft AC and a length substantially equal to a third of the length of the aircraft AC.

The length of the collection tube 7 makes it possible to observe the trend of the samples 4, in particular of the ice crystals, in time and in distance, as if the measurements of the parameters were carried out in a zone behind the aircraft AC in which the condensation trail 5 is completely formed and in which the ice crystals contained in the samples 4 have their final size and their final chemical composition.

Moreover, by knowing the type of fuel consumed by the aircraft AC in flight and the flight conditions, it is possible to measure the gradual formation of ice crystals in the condensation trail 5 as a function of the type of fuel and of the flight conditions.

In order to drive the samples 4 in the collection tube 7 from the collection probe 2 to the collection chamber 6, the system 1 can comprise a vacuum pump 9. The vacuum pump 9 makes it possible to create a vacuum in the collection tube 7 in order to suck the samples 4 through the collection probe 2 and drive them into the collection chamber 6 by suction. Moreover, the system 1 can comprise a flow rate regulator configured to regulate the flow rate of the samples 4 in the collection tube 7 sucked by the vacuum pump 9. According to a particular example, the vacuum pump 9 can act as flow rate regulator through a regulation of the pumping flow rate of the vacuum pump 9.

The system 1 also has at least one measurement device 8 configured to measure at least one parameter characterizing the samples 4 in the collection tube 7 while they are conducted from the collection probe 2 to the collection chamber 6.

The system 1 can comprise a plurality of measurement devices 8 distributed along the collection tube 7. FIG. 1 shows an example of the system 1 having three measurement devices 8, with one measurement device 8 disposed in the vicinity of the collection probe 2, one measurement device disposed in the vicinity of the collection chamber 6 and one measurement device 8 disposed substantially in the middle of the collection tube 7.

The or each of the measurement devices 8 can comprise a measurement unit 81 configured to determine at least one parameter characteristic of a chemical composition of the samples 4. The measurement unit 81 can contain a spectrometer.

The or each of the measurement devices 8 can also comprise a measurement unit 82 configured to determine at least one parameter characteristic of a particle size analysis of particles, such as ice crystals, contained in the samples 4. The measurement unit 82 can contain a granulometric sensor 82.

Thus, the spectrometer 81 makes it possible to analyze the chemical composition of the samples 4. The granulometric sensor 82 makes it possible to count the particles contained in the samples 4 and determine the size of these particles.

Moreover, by knowing the type of fuel consumed by the aircraft AC in flight and the flight conditions, it is possible to measure the concentration of particles 4 as a function of the type of fuel and the flight conditions.

The system can also comprise at least one measurement device 12 configured to measure at least one parameter characteristic of the samples 4 gathered in the collection chamber 6.

The or each of the measurement devices 12 can comprise a measurement unit 121 configured to determine a parameter characteristic of a chemical composition of the samples 4, in particular of the ice crystals contained in the samples 4.

The or each of the measurement devices 12 can also comprise a measurement unit 122 configured to determine a parameter characteristic of optical properties of the samples 4, in particular of the ice crystals contained in the samples 4. The determined optical properties can be the infrared absorption or the reflectivity of the samples 4.

Thus, it is possible to analyze in flight the optical properties of the ice crystals generated in the condensation trails 5.

The measurement unit 121 and the measurement unit 122 can each contain a spectrometer.

Advantageously, the fixing device 3 of the collection probe 2 can comprise a support 31 configured to be fixed to the fuselage of the aircraft AC and a movement module 32 fixed to the support 31. The movement module 32 is configured to move the collection probe 2 with respect to the aircraft AC. The fixing support 3 can be formed by beams mounted in pyramid configuration comprising at least three faces. For example, the base of the pyramid is fixed to the fuselage and the movement module 32 is fixed to the top of the pyramid.

Figure 2:
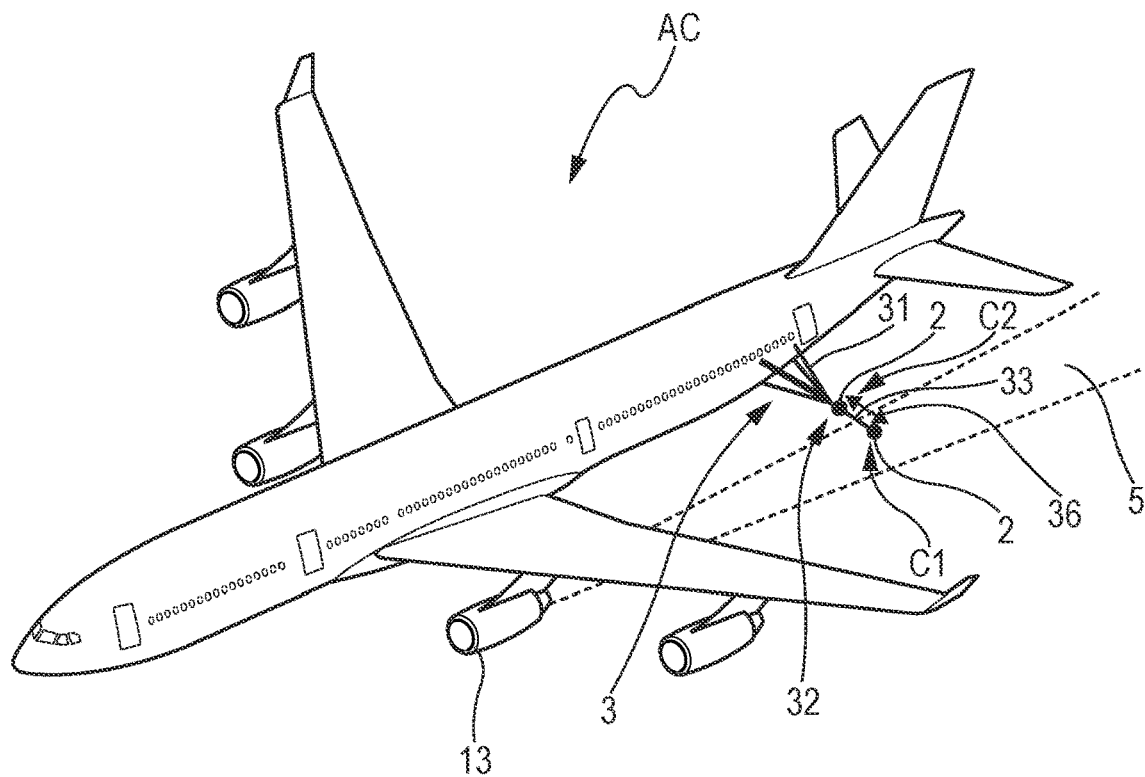
FIG. 2 represents a perspective view of an aircraft in flight with a sampling and analysis system according to one embodiment embedded.
Figure 3:
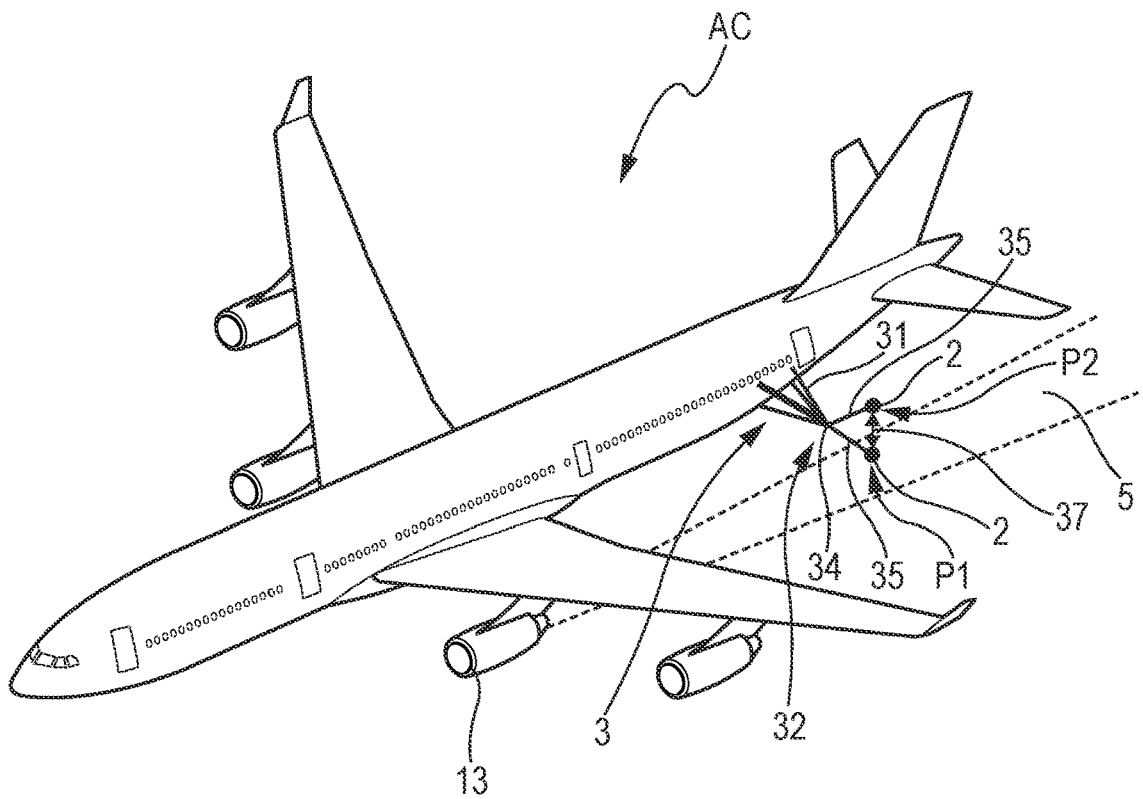
FIG. 3 represents a perspective view of an aircraft in flight with a sampling and analysis system according to another embodiment embedded.

According to a first embodiment (FIG. 2), the movement module 32 comprises a retractable rod 33 having a first end to which the collection probe 2 is fixed and a second end fixed to the support 31. The retractable rod 33 is configured to alternately assume at least a configuration in which the retractable rod 33 is extended to bring the collection probe 2 into a position C1 in which the collection probe 2 is located in the condensation trail 5 and a configuration in which the retractable rod 33 is retracted to distance the collection probe 2 from the condensation trail 5 in a position C2. FIG. 2 represents the two positions C1 and C2 of the collection probe 2. In the position C1 of the collection probe 2, the retractable rod 33 is in the configuration in which it is extended, whereas, in the position C2 of the collection probe 2, the retractable rod 33 is in the configuration in which it is retracted. In FIG. 3, the double arrow 36 indicates the transition from the position C1 to the position C2 and vice versa.

According to a second embodiment (FIG. 3), the movement module 32 comprises an articulated rod 35. The articulated rod 35 has a first end comprising an articulation 34 fixed to the support 31. The articulated rod 35 has a second end to which the collection probe 2 is fixed. The articulation 34 is configured to move the collection probe 2 alternately at least between a position P1 in which the collection probe 2 is located in the condensation trail 5 and a position P2 in which the collection probe 2 is separated from the condensation trail 5. FIG. 3 shows the two positions P1 and P2 of the collection probe 2. The reference P1 shows the position of the collection probe 2 located in the condensation trail 5 whereas the reference P2 shows the position of the collection probe 2 separated from the condensation trail 5. In FIG. 3, the double arrow 37 indicates the transition from the position P1 to the position P2 and vice versa. According to one configuration, the movement module 32 can also bring the articulated rod 35 into another position (not represented) in which the collection probe 2 is located in a condensation trail of another jet engine of the aircraft AC.

Figure 4:
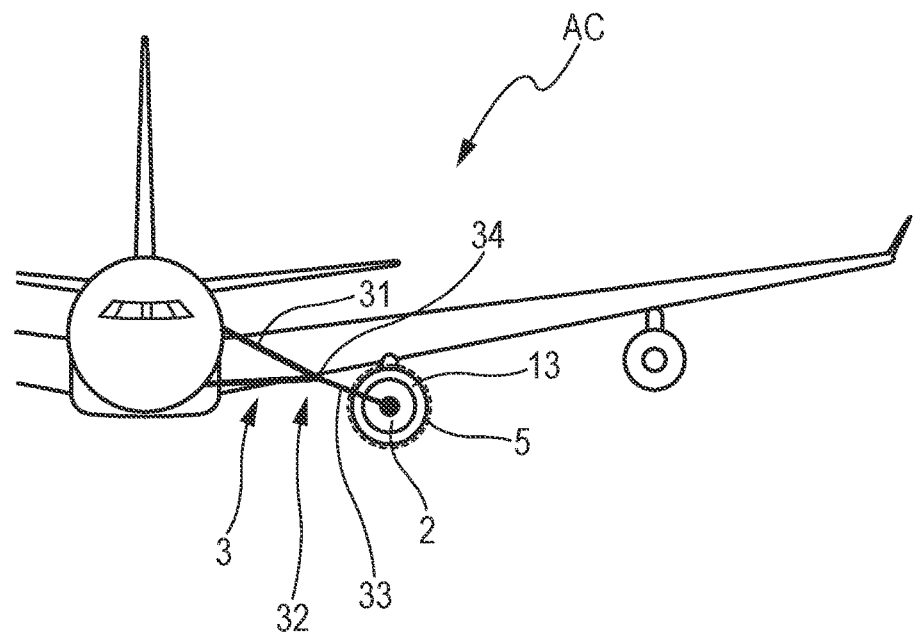
FIG. 4 represents a front view of an aircraft with a sampling and analysis system embedded, in which the collection probe is placed in the condensation trail.
Figure 5:
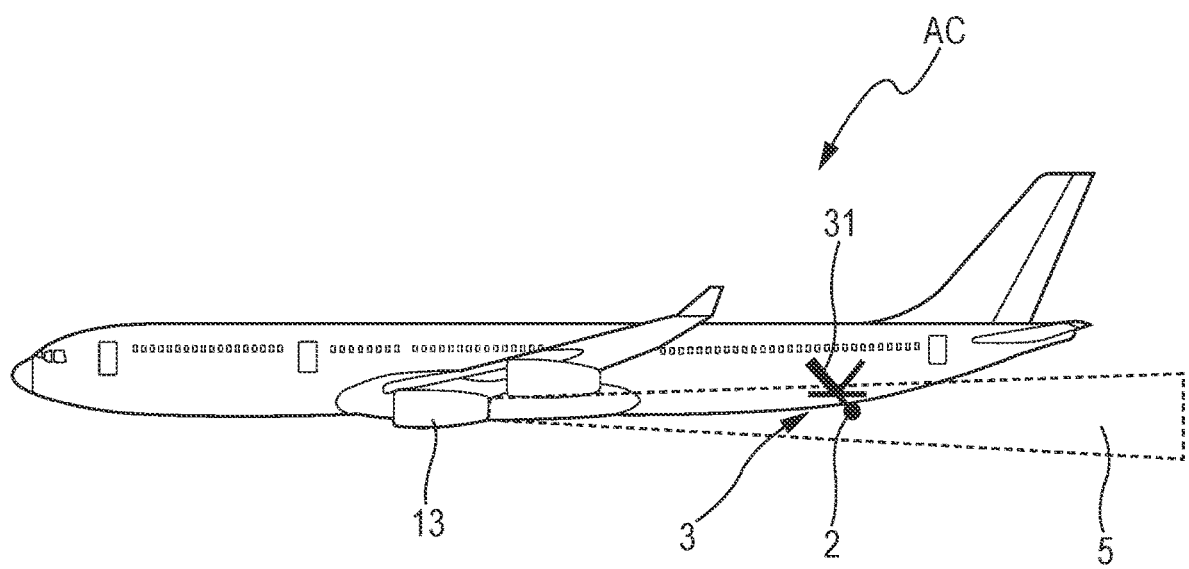
FIG. 5 represents a profile view of an aircraft with a sampling and analysis system embedded, in which the collection probe is placed in the condensation trail.

FIGS. 4 and 5 represent the collection probe 2 in the position P1 or the position C1.

Other embodiments can be envisaged. As an example, the articulated rod 35 of the second embodiment can be a retractable rod, such as the retractable rod 33 of the first embodiment.

Advantageously, the system 1 also comprises a temperature regulation device 10 configured to maintain the interior of the collection tube 7 at a desired operating temperature. The operating temperature can be equal to an external temperature of the aircraft AC.

The temperature regulation device 10 can comprise an insulating tube 11 (represented by a solid line in FIG. 1) at least partly jacketing the collection tube 7. The insulating tube 11 is configured to circulate, between the collection tube 7 and the insulating tube 11, a refrigerant or a mix of refrigerant and air. For example, the air with which the refrigerant is mixed can originate from inside the cabin of the aircraft AC. The air inside the cabin of the aircraft is generally hotter than the refrigerant. The temperature regulation device 10 can thus regulate the temperature in the collection tube 7. The temperature regulation can be performed by regulating the flow rate of the refrigerant or by regulating the flow rate of said mix of refrigerant and air between the insulating tube 11 and the collection tube 7. Alternatively, or in complement, the temperature regulation can be performed by modifying the proportions of the mix between the refrigerant and the air.

As an example, the refrigerant can be liquid nitrogen.

The formation of ice crystals in the condensation trail 5 depends on the temperature of the environment in which it is propagated. For example, at the output of the jet engine 13, the environment is very hot then cools as the distance from the jet engine 13 increases. The ice crystals form during the cooling. The temperature regulation in the collection tube 7 allows the temperature changes of the environment in which the condensation trail is propagated to be simulated. Thus, it is possible reproduce, in the collection tube 7, the trend of the formation of the ice crystals in a condensation trail 5.

Moreover, the collection chamber 6 can be configured to be maintained at a temperature of conservation of the ice crystals contained in the samples 4 gathered in the collection chamber 6. The temperature regulation device 10 can participate in maintaining the temperature of conservation of the ice crystals of the samples 4 in the collection chamber 6.

Thus, it is possible to simulate different atmospheric conditions by changing the temperature inside the collection tube 7.

The system 1 can also comprise at least one computation unit and a memory (not represented). The computation unit makes it possible to manage the system 1 by synchronizing, for example, the vacuum pump 9, the measurement devices 8 and 12 and the temperature regulation device 10. The memory makes it possible, for example, to memorize the parameters measured by the measurement devices 8 and 12 and the parameter measurement conditions. The measured parameters can be sent to a user device to be processed. The computation unit can also process the measured parameters.

Figure 6:
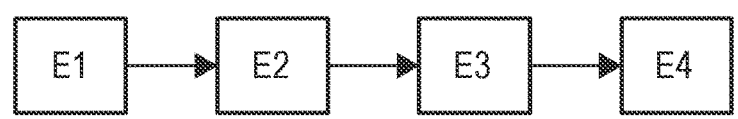
FIG. 6 schematically represents the method for using the sampling and analysis system.

The invention relates also to a method for using the system 1 (FIG. 6).

The method comprises the following steps:

a step E1 of collection, by the collection probe 2, of samples 4 of the condensation trail 5;

a step E2 of conducting, by the collection tube 7, of the samples 4 collected by the collection probe 2 to the collection chamber 6;

at least one step E3 of measurement, by measurement device or devices 8, of at least one parameter characteristic of the samples 4 in the collection tube 7 while they are conducted from the collection probe 2 to the collection chamber 6;

a step E4 of collection, in the collection chamber 6, of the samples 4 collected by the collection probe 2 and conducted by the collection tube 7.

Preferably, the collection step E1 is preceded by a preparation step.

The preparation step can comprise the following substeps:

a depressurization substep, implemented by the vacuum pump 9, consisting in depressurizing the collection tube 7;

a temperature regulation substep, implemented by the temperature regulation device 10, consisting in regulating the temperature of the collection tube 7 at a desired operating temperature;

a placement substep, implemented by the movement module 32, consisting in placing the collection probe 2 in the condensation trail 5;

a substep of opening of the valve of the collection probe 2.

Moreover, the collection step E4 can be followed by a step of measurement, by the measurement device or devices 12, of at least one parameter characteristic of the samples 4 in the collection chamber 6.

The collection chamber 6 can contain a sampling chamber in which the measurements can be carried out. Likewise, a sampling tube contained in the sampling chamber can make it possible to take samples from the collection chamber 6 in order to store them at a desired operating temperature for additional analyses.

By virtue of the system 1 and the method, there is no need to use a second aircraft following the aircraft AC for which there is a desire to analyze the condensation trails 5. Furthermore, a probe placed far behind the aircraft AC would not have made it possible to study the nature of the samples 4. The system 1 and the method also avoid mounting a spectrometer on the tail of the aircraft AC to measure the chemical nature of the condensation trails 5 behind the aircraft AC. Indeed, a spectrometer placed at this point would not have made it possible to obtain indications as to the nature, the formation and the density of the ice crystals contained in the samples 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for sampling and analyzing a condensation trail generated by at least one jet engine of an aircraft in flight,
wherein said system is configured to be embedded onboard the aircraft and said system comprises:
a collection probe configured to be fixed to the aircraft by a fixing device and to collect samples of the condensation trail generated by said jet engine of said aircraft in flight;
a collection chamber configured to gather the samples collected by the collection probe;
a collection tube configured to conduct the samples from the collection probe to the collection chamber; and
at least one first measurement device configured to measure at least one parameter characterizing the samples in the collection tube while said samples are conducted from the collection probe to the collection chamber,
wherein the fixing device comprises:
a support configured to be fixed to the fuselage of the aircraft; and
a movement module fixed to the support, the movement module configured to move the collection probe, and
wherein the movement module comprises an articulated rod, the articulated rod having a first end comprising an articulation fixed to the support and a second end to which the collection probe is fixed, the articulation being configured to move the collection probe alternately at least between a first position in which the collection probe is located in the condensation trail and a second position in which the collection probe is separated from the condensation trail.

2. The system as claimed in claim 1, wherein said system comprises a vacuum pump configured to drive the samples from the collection probe to the collection chamber.

3. The system as claimed in claim 1, further comprising a temperature regulation device configured to maintain the interior of the collection tube at a predetermined operating temperature.

4. The system as claimed in claim 3, wherein the temperature regulation device comprises an insulating tube at least partly jacketing the collection tube, the insulating tube configured to circulate a refrigerant or a mix of refrigerant and air between the collection tube and the insulating tube.

5. The system as claimed in claim 1, wherein the at least one first measurement device comprises a first measurement unit configured to determine at least one parameter characteristic of a chemical composition of the samples.

6. The system as claimed in claim 5, wherein the at least one first measurement device comprises a second measurement unit configured to determine at least one parameter characteristic of a particle size analysis of particles contained in the samples.

7. The system as claimed in claim 1, wherein the collection chamber is configured to be maintained at a temperature of conservation of the samples gathered in the collection chamber.

8. The system as claimed in claim 1, further comprising at least one second measurement device configured to measure at least one parameter characteristic of the samples gathered in the collection chamber.

9. The system as claimed in claim 8, wherein the at least one second measurement device comprises a third measurement unit configured to determine a parameter characteristic of a chemical composition of the samples.

10. The system as claimed in claim 9, wherein the at least one second measurement device comprises a fourth measurement unit configured to determine a parameter characteristic of optical properties of the samples.

11. A method for using a system for sampling and analyzing a condensation trail generated by at least one jet engine of an aircraft in flight as claimed in claim 1,
wherein said method comprises:

collecting, by the collection probe, samples of the condensation trail generated by said jet engine of said aircraft in flight;

conducting, by the collection tube, the samples collected by the collection probe to the collection chamber;

measuring, by the at least one first measurement device, at least one parameter characteristic of the samples in the collection tube while said samples are conducted from the collection probe to the collection chamber; and collecting, in the collection chamber, the samples collected by the collection probe and conducted by the collection tube.

12. An aircraft, wherein said aircraft comprises a sampling and analysis system as claimed in claim 1.

* * * * *